United States Patent [19]
Seyfried

[11] 3,745,293
[45] July 10, 1973

[54] GROUND DETECTOR IMPROVEMENT

[75] Inventor: Richard F. Seyfried, Parma Heights, Ohio

[73] Assignee: Park-Ohio Industries, Inc., Cleveland, Ohio

[22] Filed: Mar. 7, 1972

[21] Appl. No.: 232,483

[52] U.S. Cl.......... 219/10.75, 219/10.41, 219/10.67
[51] Int. Cl. ............................................. H05b 5/08
[58] Field of Search..................... 219/10.75, 10.77, 219/10.67, 10.41, 10.43, 69 C, 69 P; 317/18

[56] References Cited
UNITED STATES PATENTS

| | | | |
|---|---|---|---|
| 3,433,918 | 3/1969 | Kauffman | 219/10.77 |
| 3,213,258 | 10/1965 | Ferguson | 219/69 P |
| 3,376,476 | 4/1968 | Porterfield et al. | 219/10.77 UX |
| 3,530,270 | 9/1970 | Ross | 219/69 C |

*Primary Examiner*—J. V. Truhe
*Assistant Examiner*—B. A. Reynolds
*Attorney*—James H. Tilberry, Robert V. Vickers et al.

[57] ABSTRACT

An auxiliary electric control circuit is provided for an induction heating system. The auxiliary circuit is adapted to detect a short circuit between the inductor of the system and a workpiece associated in induction heating relationship therewith, and is operable in response to such a short to disconnect the inductor from its power supply and eject the workpiece from the inductor. The auxiliary circuit is also adapted, selectively, to pass a current through the inductor and workpiece and through metal chips or the like therebetween to burn the metal chips away and thus eliminate or reduce nuisance short-circuits otherwise caused by the presence of such chips during an induction heating process.

14 Claims, 1 Drawing Figure

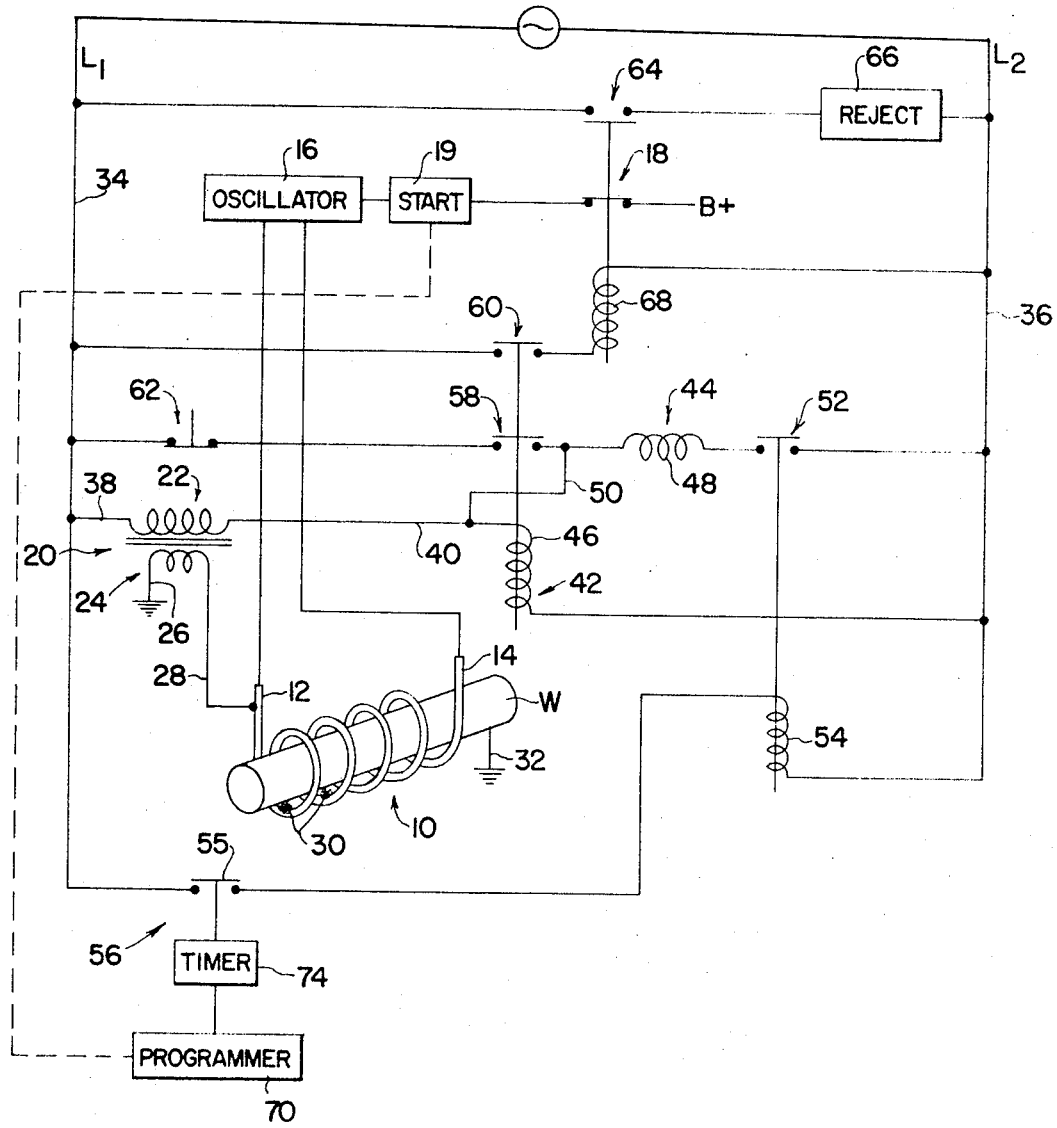

GROUND DETECTOR IMPROVEMENT

The present invention relates to the art of induction heating and, more particularly, to an improved auxiliary control circuit for the inductor of an induction heating system.

Auxiliary electric circuits have been provided heretofore in conjunction with the inductor of induction heating installations to detect and respond to a short circuit existing between the inductor and a workpiece. A short between the inductor and a workpiece disposed in induction heating relationship therewith may result from several conditions such as, for example, direct contact between the workpiece and inductor, or the presence of small chips of metal between the workpiece and inductor. The latter condition often results following the positioning of one or several workpieces relative to an inductor. More particularly, the workpieces may have loose metal chips thereon which drop from the workpieces into the space between the workpiece and inductor or project from the workpiece into the space between the workpiece and inductor. In any event, such metal chips alone, or a quantity of such chips may together span the space between a workpiece and inductor thus to complete a circuit therebetween. Since the workpiece is generally supported by metal support components of the induction heating apparatus which are grounded, a short circuit is completed to ground through the inductor and workpiece.

A short circuit of the foregoing character advantageously is detected and in response to detection thereof certain functions of the apparatus are controlled to prevent damage to the inductor and/or workpiece. For example, a control circuit may be rendered operable in response to detection of a short circuit to disconnect the inductor from its power supply, whereby the inductor is de-energized so that the necessary steps can be taken to remedy the short circuit condition. Further, a control circuit may be rendered operable to reject the workpiece from induction heating relationship with respect to the inductor.

While short detecting and remedying circuitry of the foregoing character advantageously serves to protect the inductor and/or workpieces, a considerable amount of production time is lost in shutting down the apparatus and performing the necessary maintenance operations to clear the inductor of the metal chips causing the short. Further, once the inductor area is cleaned it remains that it is only a question of time before chip accumulation will again be such as to cause a short to ground requiring shut-down and another similar maintenance operation.

Accordingly, it becomes highly desirable to eliminate or at least substantially reduce short circuits of the above character in order to reduce the number of system shut-downs resulting from such nuisance shorts and thereby increase production efficiency and inductor life. In accordance with the present invention, this is achieved by providing an auxiliary circuit operable to cause burning of metal chips disposed between the inductor and a workpiece after positioning of a workpiece relative to the inductor and prior to energization of the inductor to inductively heat the workpiece. Such burning is achieved by establishing a low voltage circuit through the inductor and workpiece and the metal chips therebetween. By maintaining the burn-out circuit at low voltage the metal chips are burned away and the inductor is not energized to the extent that the workpiece is heated prematurely. The chip burning circuitry advantageously can be incorporated with short circuit detecting circuitry of the character described hereinabove, whereby following a chip burn-out operation, the short detecting circuitry is again operative to detect and respond to the occurrence of a short circuit between the inductor and workpiece.

An outstanding object of the present invention is the provision of an auxiliary circuit for the inductor of an induction heating installation which is operable to reduce the occurrence of short circuits between the inductor and a workpiece thus to increase production efficiency.

Another object is the provision of an auxiliary circuit for the inductor of an induction heating installation which is adapted to provide for the burning of metal chips between the inductor and a workpiece independent of the primary power source for the coil.

Still another object of the present invention is the provision of an auxiliary electrical circuit for the inductor of an induction heating installation by which a low voltage circuit can be established through the inductor, a workpiece and metal chips therebetween to burn out the metal chips without adversely effecting the inductor or workpiece.

A further object is the provision of an auxiliary electrical circuit for the inductor of an induction heating installation and which auxiliary circuit is electrically operable, selectively, to detect and respond to the occurrence of a short circuit between an inductor and workpiece and to establish a low voltage short circuit path between the inductor and a workpiece and metal chips therebetween to provide for disposing of the chips by burning.

Yet another object of the present invention is the provision of an auxiliary electric circuit for the inductor of an induction heating installation which is independent of the primary power source for energizing the inductor and which is operable to protect the inductor from the effects of a short circuit between the inductor and a workpiece and to reduce the frequency of short circuits resulting from the presence of metal chips between the inductor and a workpiece disposed in induction heating relationship with respect thereto.

These and other objects will in part be obvious and in part more fully pointed out hereinafter in conjunction with the description of the accompanying drawing depicting a preferred embodiment of the present invention.

Referring now in greater detail to the FIGURE wherein the showings are for the purpose of illustrating a preferred embodiment of the invention only and not for the purpose of limiting the same, an inductor in the form of a coil 10 is illustrated having opposite ends 12 and 14 connected across a suitable power source including oscillator 16. Coil 10 may be of any desired structure and may, for example, be comprised of a continuous tube of non-magnetic conductive material such as copper wound to form an annular solenoidal coil having a given axial length and in which a metal workpiece W is adapted to be disposed in induction heating relationship with the coil. It will be readily appreciated that other inductor configurations could be employed. Any suitable mechanism, not illustrated may be provided to support the workpiece in induction heating relationship relative to the coil and may include, for example, a mechanism for moving the workpiece into and out of the coil. Alternatively, the workpiece may be fixedly supported and the coil moved relative thereto. Further, it will be appreciated that coil 10 is adapted to be energized through oscillator 16 to inductively heat workpiece W when the latter is properly positioned relative thereto. The DC power supply to oscillator 16 and thus energization of coil 10 to inductively heat workpiece W is controlled through a suitable switch 18 and start control 19 in the manner to be described more fully hereinafter.

Coil 10 is provided with an auxiliary electrical circuit independent of the power supply to oscillator 16, and the auxiliary circuit includes a transformer 20 having primary and secondary windings 22 and 24, respectively. Secondary winding 24 has one end 26 connected to ground and the other end 28 connected to coil end 12. When a workpiece W is disposed in coil 10 in induction heating relationship with the coil, the workpiece is normally spaced from the coil, whereby the circuit through secondary winding 24 is open. In the event of a short between the coil and workpiece, such as by the workpiece directly contacting the coil or the presence of metal chips 30 between the coil and workpiece, the coil is shorted to ground. The short circuit path is through the workpiece W and the portion of the apparatus supporting the workpiece and which is designated schematically by ground 32, whereby a circuit through secondary winding 24 is completed to ground. The effect of shorting the coil to ground is set forth more fully hereinafter.

The auxiliary circuit further includes a pair of leads 34 and 36 having outer ends $L_1$ and $L_2$, respectively, connectable to a 120 volt source of alternating current, not illustrated. Primary winding 22 has one end 38 thereof connected to lead 34 and has its other end 40 connected to lead 36 through first and second circuits 42 and 44, respectively. Circuit 42 includes a current responsive relay switch coil 46 in series with primary winding 22 of transformer 20, and circuit 44 includes an inductance coil 48 adapted to be connected in series with primary winding 22 through a lead 50 and a switch 52 which is operable to open and close the second circuit. When switch 52 is closed inductance coil 48 is connected in series with primary winding 22 of transformer 20 and in shunt with current responsive relay coil 46 in circuit 42, for the purpose set forth hereinafter. Switch 52 is adapted to be selectively opened and closed and is controlled by a relay coil 54 connected across leads 34 and 36 trough a normally open switch 55 controlled by a programmer and timer assembly 56.

Current responsive relay coil 46 is adapted to actuate a pair of normally open switches 58 and 60. Switch 58 is in a lock-in circuit for circuit 42 and which lock-in circuit includes a normally closed reset switch 62 in series with switch 58 between lead 34 and lead 50. Flow of current through coil 46 at a predetermined magnitude as set forth more fully hereinafter, causes switches 58 and 60 to close, and switch 58 thus completes a bypass circuit around primary winding 22 of transformer 20 and through coil 46 to lead 36. This bypass circuit maintains coil 46 energized so that switch 58 remains closed until such time as reset switch 62 is opened to deenergize coil 46. Switch 60 controls the actuation of switch 18 and, if desired, a reject switch 64 operatively associated with a workpiece reject control 66. Switches 18 and 64 advantageously provide for control functions to be performed when a short of the coil to ground is detected by current responsive relay coil 46. In this respect, for example, switch 18 normally closes the power supply circuit to oscillator 16 from a DC voltage source designated B+. When switch 18 is open the supply circuit is broken, whereby coil 10 id de-energized. Switch 64 is normally open and is adapted to close in response to a short of the coil to ground to close a circuit to reject control 66 which then functions in any suitable manner to cause ejection or removal of workpiece W from coil 10. Opening of switch 18 and closing of switch 64 is controlled by a common relay switch coil 68. Coil 68 is connected across leads 34 and 36 through normally open switch 60, and when the latter switch closes in response to energization of relay coil 46, coil 68 is energized to actuate switches 18 and 64. It will be appreciated that since the energization of coil 46 is maintained through the bypass circuit including switches 58 and 62, the oscillator control and reject circuits are maintained open and closed, respectively, until reset switch 62 is opened. Reset switch 62 may be of any suitable structure and may, for example, be a push button switch normally closed under a spring bias and displacable against the spring biass to open the bypass circuit when desired.

As mentioned hereinabove, inductance coil 48 in second circuit 44 is adapted to be connected in series with primary winding 22 of transformer 20 upon the selective closure of switch 52. When switch 52 is closed the inductance of coil 48 is operable to reduce the effective volts per turn in primary winding 22, thus to reduce the voltage inducible in secondary winding 24 of the transformer. Thus, for example, the selection of the inductance coil can be such that introduction of the inductance in series with the primary winding results in an induced voltage of about 10 volts across secondary winding 24. The purpose of the low voltage secondary circuit of the transformer is set forth more fully hereinafter.

Assuming the several switches of the auxiliary circuit to be in the positions thereof illustrated in the drawing, and further presuming workpiece W to be disposed within coil 10 and out of contact therewith and that there are no metal chips 30 between the coil and workpiece, the circuit through secondary winding 24 of transformer 20 is open, whereby the current through primary winding 22 is relatively low. The level of the current through primary 22 under these conditions is insufficient to energize current responsive relay coil 46 to close switches 58 and 60, whereby these switches remain open. Accordingly, switches 18 and 64 remain closed and open, resepectively, whereby oscillator 16 is operable to energize coil 10 to inductively heat workpiece W. In the event of a short circuit of the coil to ground, however, such as by direct contact of workpiece W with coil 10 or contact therebetween through metal chips 30, the circuit through secondary winding 24 is completed to ground, whereby the voltage drop across primary winding 22 is reduced resulting in an increase in the current flow through primary winding 22 to current responsive coil 46. The magnitude of current flow in the primary circuit under these conditions is sufficient to energize relay coil 46 to close switches 58 and 60. Closure of switch 58 establishes a bypass circuit through switch 62 and lead 50 to coil 46 to maintain coil 46 energized, whereby switches 58 and 60 remain closed. Closure of switch 60 results in energization of relay coil 68 to open switch 18 and close switch 64, whereby the power source circuit to oscillator 16 is opened to de-energize coil 10, and reject control 66 is energized to that workpiece W is removed from coil 10. Upon opening of reset switch 62, the circuit to coil 46 is broken, whereby switches 58 and 60 open. Thus, the first circuit 42 is readied for a further short circuit detecting function, the oscillator power supply circuit is closed and reject control 66 is rendered inoperable in preparation for a subsequent reject function. Since the workpiece previously positioned in the coil has been removed, the short circuit is no longer present and the circuit through secondary winding 24 of the transformer is opened whereby current flow through the primary winding 24 is insufficient to energize relay coil 46 to the extent necessary to cause closure of switches 58 and 60.

While it is advantageous to provide for controlling apparatus functions in response to the detection of a short circuit of the foregoing character, it is likewise desirable to eliminate to the extent possible nuisance-type short circuits caused by grounding the coil through the workpiece as the result of metal chips between the coil and workpiece. The second circuit 44 advantageously functions to reduce or eliminate such nuisance type short circuits. In this respect, again presuming that a workpiece has been positioned within coil 10 and is supported in spaced relationship with respect thereto, switch 52 is closed to connect inductance coil 48 in series with primary winding 22 of transformer 20. This establishes a circuit through primary winding 22 across leads 34 and 36 through inductance coil 48 so that the full 120 volts across the leads is impressed across the primary and inducance coils. The inductance coil in series with the primary winding reduces the volts per turn thereof available to be induced into secondary winding 24. If chips 30 are not present between workpiece W and coil 10, then the closing of switch 52 has no effect. If, on the other hand, chips 30 are present, whereby a shorting of the coil to ground would occur, the secondary circuit is completed to ground and a low voltage of, for example, 10 volts flows through the secondary circuit to coil 10 and thence to workpiece W through chips 30. Since the chips are in the secondary circuit they will be burned out by the low voltage flow, thus to clear the potential short circuit condition. The low voltage flow protects the coil from damage and also prevents undesired heating of the workpiece during the chip clearing operation. After a preselected period of time, switch 52 is opened whereby the primary winding is once again in circuit across leads 34 and 36 through relay coil 46.

The actuation of switch 52 could, of course, be manual but preferably is automatic and under the control of programmer and timer assembly 56 which is adapted to open and close a circuit to relay coil 54 of switch 52. Thus, in a cycle of operation of the induction heating apparatus, switch 55 can be timed to close the circuit through coil 54 so that switch 52 closes each time a workpiece is positioned in inductive heating relationship with respect to coil 10 and prior to energization of the coil to inductively heat the workpiece. Since the moving and positioning of the workpiece relative to the coil is apt to cause metal chips or scale to be deposited between the workpiece and coil, this arrangement advantageously provides for eliminating a potential short circuit condition prior to the induction heating step. After the timed burn-out function, short circuit detecting circuit 42 functions thereafter to detect and respond to any short which may occur during a given induction heating operation. Programmer and timer assembly 56 further facilitates the automatic and sequential operation of induction heating coil energization and chip burn-out. In this respect, it will be appreciated that coil 10 must be de-energized during the period when switch 52 is closed to achieve chip burn out. The programmer 70 advantageously provides for this function to be achieved. For example, the oscillator start control 19 which is provided between power supply B+ and the oscillator can be operatively interconnected with programmer 70 to open the circuit to the oscillator at the same time the programmer operates to cause closure of switch 55 through timer 74. After expiration of the preselected period of timed closure of switch 55, timer 74 operates to open switch 55 whereby the burn out period is terminated. The programmer can then function to actuate oscillator start control 19 so that coil 10 is energized to inductively heat workpiece W. It will be appreciated too that programmer 70 can be employed to provide for programmed control of the normal feeding and removing of a workpiece relative to coil 10 as well as any other functions of apparatus operation that might be desired.

While considerable emphasis has been placed herein on the fact that the short circuit detecting portion of the auxiliary circuit is operative to control de-energization of the coil and rejection of a workpiece, it will be appreciated that these auxiliary functions which, while preferable, are not absolutely necessary to operation of the auxiliary circuit. For example, the short detecting and responsive portion of the auxiliary circuit could be designed to provide other control functions or merely to provide a visual or audible indication of a short circuit condition to which an operator would respond by taking appropriate steps to correct the condition. Further, while the chip-burn out portion of the auxiliary circuit has been described in combination with the short detecting and responsive circuit, it will be appreciated that chip burn-out circuitry could be employed to advantage as a separate circuit with or without the short circuit detecting portion. In this respect, for example, the primary winding of the transformer could be connected directly across a source of alternating current and the turn ratio between the primary and secondary windings could be such as to provide the desired voltage in the secondary for the burn out function when the primary is energized. Moreover, switch or other control means could be provided to selectively connect and disconnect the primary from the power source to achieve a burn out operation when desired. Other burn out circuit arrangements will be apparent to those skilled in the art. Still further, while the inductor is illustrated herein as being energized through an oscillator, it will be appreciated that the coil could be energized from other suitable power supply sources and that the coil de-energizing control circuit could readily be adapted to control energization of the coil from such a source.

Having thus described my invention, I claim

1. An auxiliary electrical circuit for burnout of particulate metallic material present between the inductor of an induction heating installation and a workpiece spaced from and disposed in induction heating relationship with the inductor, comprising: an inductor and workpiece circuit including said inductor and a workpiece disposed in induction heating relationship therewith and in which circuit said inductor and workpiece are adapted to be coupled in electrical series by particulate metallic material bridging the space therebetween, a power source for said auxiliary circuit, and means electrically coupling said inductor and workpiece circuit with said power source to energize said inductor and workpiece circuit when said inductor and workpiece are coupled in series to burn out particulate material between said inductor and workpiece.

2. An auxiliary electrical circuit for burn-out of particulate metallic material present between the inductor of an induction heating installation and a workpiece spaced from and disposed in induction heating relationship with the inductor, comprising: an inductor and workpiece circuit including said inductor and a workpiece disposed in induction heating relationship therewith and in which circuit said inductor and workpiece are coupled in electrical series by particulate metallic material bridging the space therebetween, a power source for said auxiliary circuit, means electrically coupling said inductor and workpiece circuit with said power source to energize said inductor and workpiece circuit when said inductor and workpiece are coupled in series to burn out particulate material between said inductor and workpiece, said inductor and workpiece circuit including the secondary winding of a transformer and said coupling means being the primary winding of said transformer, said primary winding being connected across said power source, said secondary winding having one end thereof connected to ground and the other end connected to said inductor, and means connecting said workpiece to ground.

3. The auxiliary circuit according to claim 2, and means connectable in series with said primary winding to control the voltage induced in said secondary winding.

4. The auxiliary circuit according to claim 3, and means in series with said primary winding for detecting shorting of said inductor to ground.

5. The auxiliary circuit according to claim 4, wherein said inductor is energized by a second power supply and said detecting means is a current responsive relay coil, and switch means actuable by said coil to control energization of said inductor.

6. The auxiliary circuit according to claim 4, wherein said means connectable in series with said primary winding is an inductance coil, and second switch means selectively closable to complete a circuit connecting said inductance coil in series with said primary winding and in parallel with said detecting means.

7. The auxiliary circuit according to claim 6, and means for maintaining said second switch means closed for a preselected period of time.

8. The auxiliary circuit according to claim 7, and means to cause closure of said second switch means to initiate said timed period.

9. The auxiliary circuit according to claim 8, wherein said closure causing means is programmer means.

10. An auxiliary electrical circuit for induction heating apparatus including an induction heating coil comprising: switch means for controlling said apparatus, a transformer having primary and secondary windings, said secondary winding having ends connected one to said coil and the other to ground whereby a circuit is completed through said secondary upon shorting said coil to ground, a pair of leads connectable to a source of alternating current, means connecting said primary winding across said leads and including a current responsive relay coil in series with said primary winding and responsive to shorting said coil to ground to cause actuation of said switch means, a normally open circuit including an inductance and adapted when closed to place said inductance in series with said primary winding and in parallel with said relay coil, and switch means in said normally open circuit for selectively closing said latter circuit.

11. The auxiliary circuit according to claim 10, wherein said coil is connected to a power source for energizing said coil to inductively heat a workpiece disposed in inductive heat-relationship therewith, said switch means for controlling said apparatus including a switch operable to de-energize said coil upon shorting said coil to ground.

12. The auxiliary circuit according to claim 11, and reject means for removing a workpiece from induction heating relationship with said coil, a reject circuit across said leads and including said reject means and operable when closed to energize said reject means to remove a workpiece from said coil, and said switch means for controlling said apparatus including a switch operable to close said reject circuit upon shorting said coil to ground.

13. The auxiliary circuit according to claim 10, wherein said switch means in said normally open circuit includes a relay coil connected across said leads through a normally open switch, and programmable control means for periodically closing said normally open switch to energize said latter relay coil and close said normally open circuit.

14. The auxiliary circuit according to claim 13, wherein a workpiece is adapted to be disposed in induction heating relationship with respect to said coil, and said programmable control means is operable to close said normally open switch upon so positioning a workpiece relative to said coil.

* * * * *